Feb. 26, 1963 B. EGGER 3,078,773
FEELER DEVICE RESPONSIVE TO THE POSITION OF
THE NEEDLE OF A GALVANOMETER
Filed March 21, 1961

INVENTOR
BERNARD EGGER 3,078,773
FEELER DEVICE RESPONSIVE TO THE POSITION OF THE NEEDLE OF A GALVANOMETER
Bernard Egger, Yverdon, Vaud, Switzerland, assignor to Paillard S.A., Sainte-Croix, Switzerland, a corporation of Switzerland
Filed Mar. 21, 1961, Ser. No. 97,230
Claims priority, application Switzerland Mar. 29, 1960
5 Claims. (Cl. 95—10)

Feeler devices responsive to the position of the needle of a galvanometer are already known, comprising a bearing member for the needle and a feeler member adapted to abut against the needle. In known constructions the mechanism is relatively complicated and consequently expensive.

The present invention has for its object a device of the type referred to, of particularly simple construction and very certain functioning. This device is characterised in that the bearing member has a surface parallel to that generated by the movement of the needle, the feeler member comprising a wheel disposed in such a manner as to roll on the said surface, means permitting of moving the feeler member until the needle is clamped between the wheel and the bearing surface.

One form of construction of the subject of the invention, applied to a camera, is shown diagrammatically and by way of example in the accompanying drawings, wherein.

Figure 1:
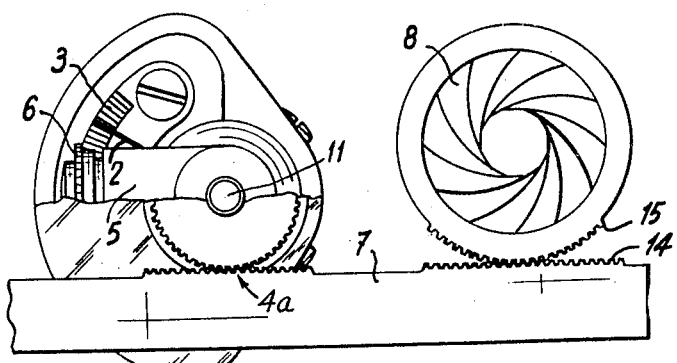
FIG. 1 is a front view of this form of construction, a portion of the outer casing being removed.
Figure 2:
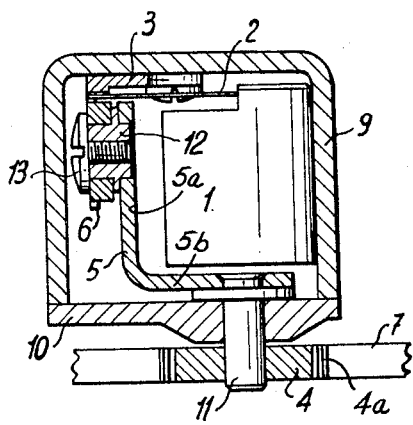
FIG. 2 is an axial section.

The device illustrated comprises a galvanometer 1 provided with a needle 2 which moves over a bearing member, here shown in the form of a toothed sector 3, the said galvanometer being secured in a stationary casing 9 (FIG. 2). This casing includes a cover 10 rotatably supporting a spindle 11 carrying a toothed wheel 4 on its outer end, said wheel meshing with a second rack portion 4ª on a manually shiftable rack bar 7. This rack bar carries a second toothed portion 14 for engaging with the peripheral toothed sector 15 of an iris-type diaphragm 8 so that the rack 7 moves in a direction tangent to the sector.

The casing 9 in which the galvanometer 1 is fixedly mounted houses a support 5 having angularly disposed arms 5ª and 5ᵇ. The latter arm is connected with the spindle 11 to move therewith. Thus, as the toothed portion 4ª of the rack 7 engages the toothed wheel 4, the spindle will be moved and, in turn, the support 5 will have angular movement imparted thereto.

The arm 5ª of the support 5 is provided with a stud 12 to which a toothed wheel 6 is rotatably secured by the screw 13 so that as said arm 5ª turns, the teeth of the wheel 6 have a rolling engagement with the stationary toothed sector 3 fixed in the casing 9, and the needle 2 acts as a chock between the wheel 6 and sector 3.

It will of course be seen from the drawings that the toothed sector 3 is concentric with the pivotal axis of the needle 2 of the galvanometer and the spindle 11 is also coaxial with the axis of the said needle.

The functioning of the device described is very simple:
Before photographing, the rack 7 is moved for obtaining an extreme position of adjustment of the diaphragm, for example its maximum opening. The photo-electric cell feeding the galvanometer 1 is exposed to light, in general in an automatic manner, so that the needle 2 assumes a position depending on the luminosity of the scene to be photographed. The rack 7 is then moved through wheel 4 and rack teeth 4ª in a direction of closing the diaphragm, which causes the arm 5 to pivot and the wheel 6 to roll on the toothed sector 3. This movement continues until the moment at which the needle 2 is clamped between the toothed wheel 6 and the toothed sector 3, to act as an obstruction or chock to stop the rotation of the arm 5 and thus of the rack 7. The degree of opening obtained for the diaphragm thus depends on the position of the needle 2 of the galvanometer. By the correct adaptation of the deviation of the galvanometer in proportion to the luminosity of the scene to be filmed, it is possible to obtain in all the usual conditions of photographing, an exact exposure by reason of the automatic adjustment of the diaphragm at the value indicated by the galvanometer 1.

It will be understood that naturally different modifications may be provided and in particular it is not indispensable that the bearing surface should be constituted by a toothed sector. In fact, this bearing surface may be smooth and the toothed wheel may be replaced by a roller rolling on this smooth surface.

What I claim is:
1. Light control apparatus comprising, in combination,
   a stationary casing (9) including a cover (10),
   a diaphragm (8) spaced laterally from the casing,
   a movable peripheral toothed sector (15) on the diaphragm,
   a rack (7) slidable tangentially relative to said peripheral toothed sector (15), said rack having a first set of teeth (14) engaged with said sector (15) and a second set of teeth (4ª),
   a stationary toothed sector (3) within the casing,
   a galvanometer (1) secured in said casing,
   a needle (2) for the galvanometer adapted to move over the surface of said stationary toothed sector (3) whose axis coincides with the axis of the needle,
   a spindle (11) rotatably mounted on the cover (10) of the casing,
   a toothed wheel (4) on said spindle (11) engaging with said second set of teeth (4ª) on the rack (7),
   a support (5) having angularly disposed arms (5ª+5ᵇ), one of which (5ᵇ) is connected with the spindle (11),
   a stud (12) carried by the other arm (5ª) of said support (5),
   and a toothed wheel (6) mounted on said stud and secured in place by a screw (13), said wheel meshing with the stationary toothed sector (3),
   whereby, when the galvanometer (1) is energized the needle (2) will move over said sector (3) toward the wheel (6) and as the rack (7) moves the said wheel (6) toward the needle, further movement of said wheel (6) is arrested due to the needle acting as a chock to hold the rack (7) in position to maintain the diaphragm in adjusted position.

2. Light control apparatus comprising, in combination,
   an iris type diaphragm (8) and a support (5),
   actuating means (7+14+15 and 4) for simultaneously operating the diaphragm (8) and support (5),
   a stationary casing (9—10),
   a galvanometer fixed in said casing,
   a needle for the galvanometer,
   a bearing member (3) mounted in said casing and having a surface parallel to the plane of movement of the needle (2),
   and a wheel (6) carried by said support (5) and responsive to movement thereof relative to the surface of the bearing member,
   whereby, as the needle (2) advances over said bearing member toward the wheel (6), it provides an obstruction to hold the needle (2), the wheel (6), the support (5), and said actuating means in fixed relation to maintain the proper setting of the diaphragm (8).

3. Apparatus according to claim 2, wherein, the support (5) includes the angularly disposed arms (5ª+5ᵇ), one of which carries said wheel (6) and the other of which has a pinion (4) mounted on a spindle (11), and said pinion engages a rack (7) forming part of said actuating means.

4. Apparatus according to claim 2, wherein, the diaphragm (8) and support (5) have toothed portions and the actuating means (7) is a rack having teeth (14 and 4ª) for engaging said toothed portions.

5. Apparatus according to claim 4, wherein, the rack (7) is manually operated to slide tangentially of the said toothed portions of the diaphragm and support.

References Cited in the file of this patent
UNITED STATES PATENTS

| | | |
|---|---|---|
| 2,968,227 | Melle | Jan. 17, 1961 |
| 2,972,289 | Melle | Feb. 21, 1961 |
| 2,982,190 | Fischer | May 2, 1961 |